Jan. 17, 1956    W. L. SMITH    2,730,830
FISHING DEVICE
Filed March 19, 1954

William L. Smith  Inventor

By *(signature)*

Attorney

2,730,830
FISHING DEVICE

William L. Smith, Philadelphia, Pa.

Application March 19, 1954, Serial No. 417,316

3 Claims. (Cl. 43—25)

This invention relates to a fishing device for automatically hooking a fish which has taken a baited hook.

The object of the invention is to provide a simple and efficient slack line device that can be readily attached to a fishing reel.

Another object of this invention is to provide a reel or rod mounted slack line device which can be adjusted to release the slack in the fishing line under the variable tensions exerted by the species of fish being sought for.

These and other objects will be readily apparent to those skilled in the art.

Figure 1:
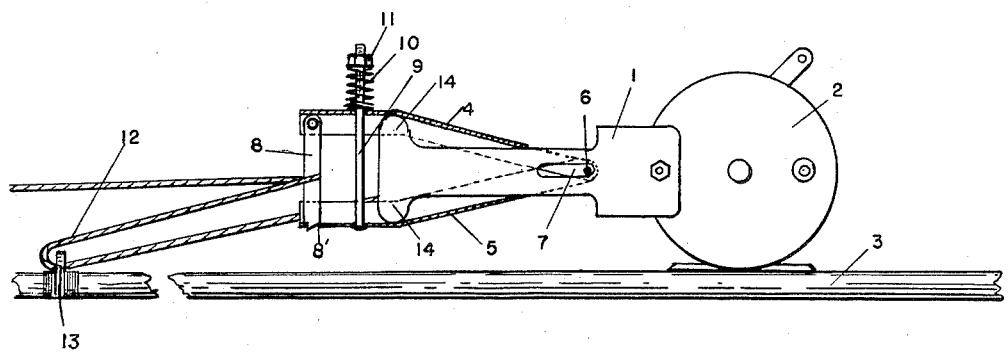
Figure 2:
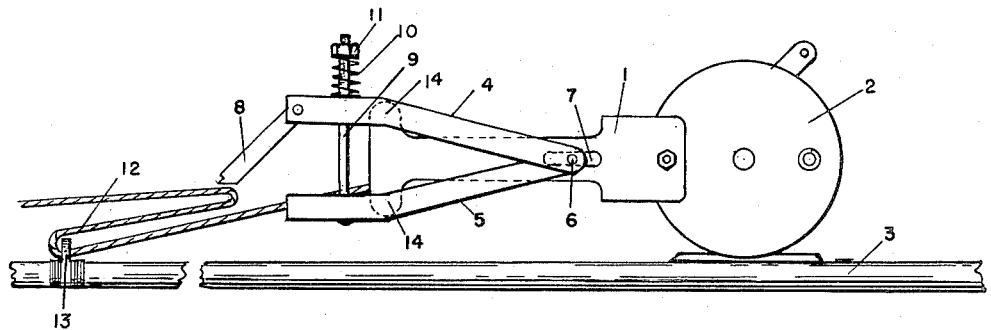
Figure 3:
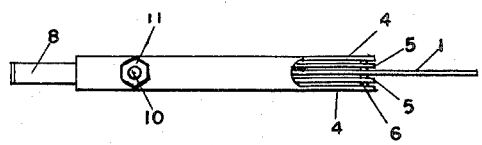

In the accompanying drawings,

Figure 1 is a side elevation, partly in section, showing the device attached to a fishing reel mounted on a rod, with the fishing line in operative position, and Fig. 2 is a similar view, not in section, showing the fishing line released after having been placed under tension by a fish taking the baited hook, and Fig. 3 is a top plan view only as shown in Fig. 2.

Reference numerals indicate the same parts in the several drawings.

In the practice of the invention as hereinafter exemplified, the support member 1, is secured to the side of a fishing reel 2, mounted on a fishing rod 3, or the device may be mounted on the fishing rod directly in front of the reel by any suitable means.

The channel members 4 and 5 are provided with bifurcated ends and are disposed on the support 1 by means of a pin 6 passing through suitable apertures in said channel members and a slot 7 in the support member 1 permitting said channel members to articulate and slide freely in said slot.

A latch member 8 is pivotally disposed in the channel member 4, the opposite end of said latch being adapted to engage a slot 8' in the member 5. The assembly is held in operative position by means of threaded bolt 9 passing through the members 4 and 5 and held under variable tension by means of a spring 10 interposed between member 4 and a nut 11 on the end of the bolt 9.

In using the foregoing device the fishing line is threaded through the guides and tip on the rod 3 in the conventional manner. The line 12 is then retracted from in front of the guide 13 adjacent the reel 2 and the loop is passed into the device in back of the latch 8 and said latch is then snapped shut as is shown in Figure 1. The click or drag on the reel is set for operation.

When a fish strikes the baited hook the assembly is pulled forward causing the cam faces 14 on the support 1 to force the channel members 4 and 5 apart to release the latch 8 and the slack portion of the line 12. Further free movement being prevented by the click or drag on the reel 1 brings the fish to a sudden stop and effectively hooks same.

The tension required to release the assembly may be varied by adjusting the spring pressure to suit the conditions encountered.

What is claimed as the invention and desired to be secured by Letters Patent, is:

1. In combination with a conventional fishing rod and reel, a support member adapted for mounting on a fishing rod or reel, and having an elongated slot therethrough adjacent one end thereof, and oppositely disposed cam members at the other end, a pair of oppositely facing channel members having bifurcated ends pivoted together, said channel members being pivotally and slidably disposed on said support member by means of a pivot slidably retained in said slot, the channel portion of said channel members slidably engaging the cam members on the support member, a latch member pivotally disposed in one channel member, the other channel member having a slot adapted to receive the free end of the latch, each latch member having an opening, a threaded bolt received therethrough, a spring mounted on said bolt resiliently biasing said channel members toward engagement with said cam members, and a nut on the bolt adapted to vary the degree of pressure of said spring required to hold the channel members in operative engagement with the cams on the housing.

2. A slack line fishing device adapted to be mounted on or adjacent a fishing reel and conventional rod comprising, a support having a slotted portion adjacent one end thereof, a cam at the opposite end of said housing, a pair of channel members slidably and pivotally mounted on the support in the slotted portion thereof, and engaging said cam on the housing, a latch member having one end pivotally disposed in one channel member, and the other channel member having a suitable opening for receiving the opposite end of said latch, said channel members having suitable openings adjacent the latch, a threaded bolt received through said openings, a spring on said bolt, a nut on said bolt adjacent the spring for varying the tension in said spring to adjust pressure of the channel members against the cam.

3. As an article of manufacture, a slack line device comprising a support member adapted to be mounted on a fishing reel, said support having a slot adjacent one end thereof and oppositely disposed cams at the other end thereof, a pair of channel members slidably and pivotally disposed on the support, pivot means pivoting said channels together and passing through said slot, a latch member pivotally disposed in the end of one channel member, and the other channel member having a suitable opening adapted to receive said latch, said channel members having registering openings adjacent the latch member, a threaded bolt received through said openings, a spring mounted on said bolt abutting the spring, and a nut on the bolt for holding the channel members in operative contact with the cam members on the housing.

References Cited in the file of this patent

UNITED STATES PATENTS

| 218,363 | Bird | Aug. 12, 1879 |
| 664,889 | Ogimura | Jan. 1, 1901 |